(12) United States Patent
Irons et al.

(10) Patent No.: US 10,291,796 B2
(45) Date of Patent: May 14, 2019

(54) USING LABELS IN A DOCUMENT PROCESSING SYSTEM

(71) Applicant: DocSolid LLC, Phoenix, AZ (US)

(72) Inventors: Steven W. Irons, Phoenix, AZ (US); David R. Guilbault, Scottsdale, AZ (US); Eric R. Lynn, Phoenix, AZ (US)

(73) Assignee: DocSolid LLC, Phoenix, AZ (US)

( * ) Notice: Subject to any disclaimer, the term of this patent is extended or adjusted under 35 U.S.C. 154(b) by 72 days.

(21) Appl. No.: 15/682,655

(22) Filed: Aug. 22, 2017

(65) Prior Publication Data

US 2019/0068807 A1    Feb. 28, 2019

(51) Int. Cl.
*G06K 9/00* (2006.01)
*H04N 1/00* (2006.01)
*G06F 16/93* (2019.01)

(52) U.S. Cl.
CPC ......... *H04N 1/00334* (2013.01); *G06F 16/93* (2019.01)

(58) Field of Classification Search
CPC ...... G06Q 10/00; G06Q 10/0833; B65C 9/46; G06K 1/121; H04L 9/3239; H04L 2209/805; H04N 1/00334; G06F 16/93
See application file for complete search history.

(56) References Cited

U.S. PATENT DOCUMENTS

| | | | |
|---|---|---|---|
| 6,192,165 B1 | 2/2001 | Irons et al. | |
| 6,427,032 B1 | 7/2002 | Irons et al. | |
| 6,674,924 B2 | 1/2004 | Wright et al. | |
| 6,744,936 B2 | 6/2004 | Irons et al. | |
| 6,952,281 B1 | 10/2005 | Irons et al. | |
| 7,182,259 B2 | 2/2007 | Lubow et al. | |
| 7,606,831 B2 | 10/2009 | Quinn et al. | |
| 7,715,061 B2 * | 5/2010 | van Os | H04N 1/00355 235/385 |
| 7,733,522 B2 | 6/2010 | Irons et al. | |
| 7,798,417 B2 | 9/2010 | Snyder et al. | |
| 7,942,328 B2 | 5/2011 | Snyder et al. | |
| 8,194,272 B2 | 6/2012 | Yoshizumi et al. | |
| 8,194,274 B2 | 6/2012 | Babbrah et al. | |
| 8,375,324 B1 | 2/2013 | Zubizarreta et al. | |
| 8,787,616 B2 | 6/2014 | Irons et al. | |

(Continued)

*Primary Examiner* — Amir Alavi
(74) *Attorney, Agent, or Firm* — Martin & Associates, LLC; Derek P. Martin

(57) ABSTRACT

A document processing system uses a label on a document that includes a machine-readable portion that identifies a document, a first defined region corresponding to a system-defined function, and a second defined region corresponding to a user-defined function. When a user hand-writes a mark in the first defined region of the label, when the document is scanned, the mark is detected, and the system-defined function corresponding to the first defined function is performed for the document. When a user hand-writes a mark in the second defined region of the label, when the document is scanned, the mark is detected, and the user-defined function corresponding to the second defined region is performed for the document. The hand-written mark can include a character, with multiple system-defined functions corresponding to different characters in the first defined region, and multiple user-defined functions corresponding to different characters in the second defined region.

18 Claims, 7 Drawing Sheets

(56) References Cited

U.S. PATENT DOCUMENTS

| | | | |
|---|---|---|---|
| 9,025,213 B1 | 5/2015 | Irons et al. | |
| 9,202,179 B2 * | 12/2015 | Gubo | H04L 9/3239 |
| 9,323,784 B2 | 4/2016 | King et al. | |
| 9,355,263 B2 | 5/2016 | Irons et al. | |
| 9,378,205 B1 | 6/2016 | Schmidt | |
| 9,721,418 B2 * | 8/2017 | van Ooyen | G06F 19/3462 |
| 9,905,056 B2 * | 2/2018 | Bowers | B07C 3/14 |
| 2001/0039625 A1 | 11/2001 | Ananda | |
| 2002/0111960 A1 | 8/2002 | Irons et al. | |
| 2003/0115162 A1 | 6/2003 | Konik | |
| 2006/0184522 A1 | 8/2006 | McFarland et al. | |
| 2006/0248129 A1 * | 11/2006 | Carnes | G06F 17/3012 |
| 2007/0198375 A1 * | 8/2007 | Aptekar | G06Q 10/08 |
| | | | 705/29 |
| 2008/0163364 A1 | 7/2008 | Ferlitsch | |
| 2008/0239328 A1 | 10/2008 | Mariotti et al. | |
| 2008/0288594 A1 * | 11/2008 | Muus | G06Q 10/00 |
| | | | 709/206 |
| 2009/0037444 A1 | 2/2009 | Stapleton | |
| 2009/0070348 A1 | 3/2009 | Uejo | |
| 2010/0033754 A1 | 2/2010 | Okita | |
| 2010/0097661 A1 | 4/2010 | Hoblit | |
| 2010/0219244 A1 * | 9/2010 | Silverbrook | G06F 3/014 |
| | | | 235/385 |
| 2010/0237993 A1 | 9/2010 | Ohsawa | |
| 2011/0001989 A1 | 1/2011 | Pesar | |
| 2011/0032547 A1 | 2/2011 | Saito | |
| 2011/0264742 A1 * | 10/2011 | Lapstun | G06Q 10/10 |
| | | | 709/204 |
| 2012/0004770 A1 * | 1/2012 | Ooyen | G06F 19/3462 |
| | | | 700/235 |
| 2013/0246158 A1 * | 9/2013 | Cannon | G06Q 10/083 |
| | | | 705/14.36 |
| 2014/0019843 A1 | 1/2014 | Schmidt | |
| 2015/0186654 A1 | 7/2015 | Albrecht | |
| 2015/0235034 A1 | 8/2015 | Irons et al. | |
| 2016/0228922 A1 * | 8/2016 | Snead | B07C 7/005 |

* cited by examiner

Docket No. DOCSOLID.1582

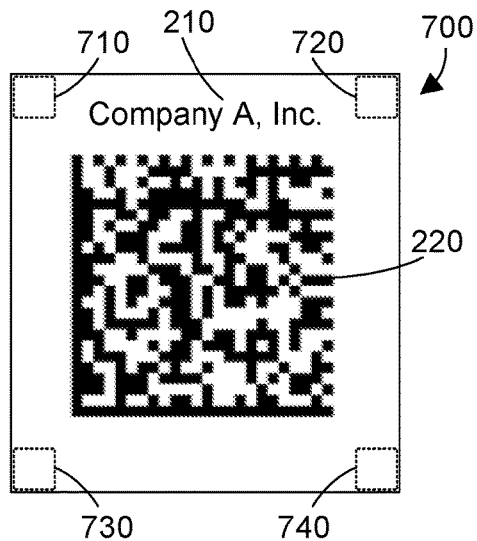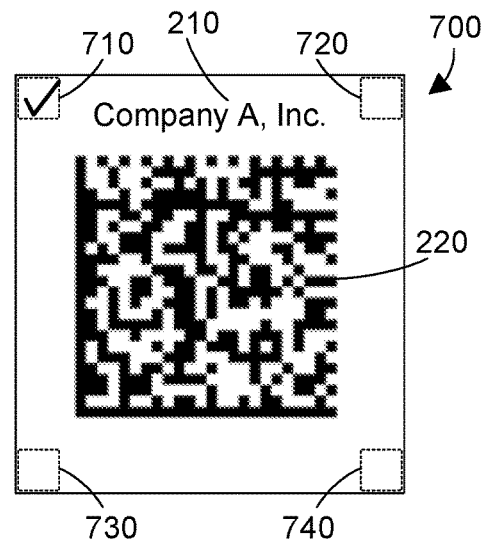
FIG. 7　　　　　　　　FIG. 8
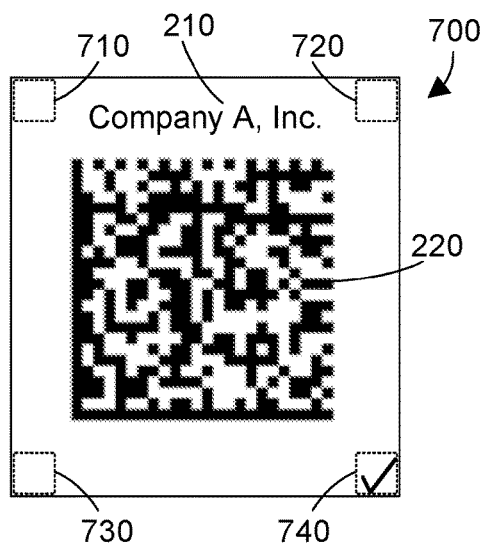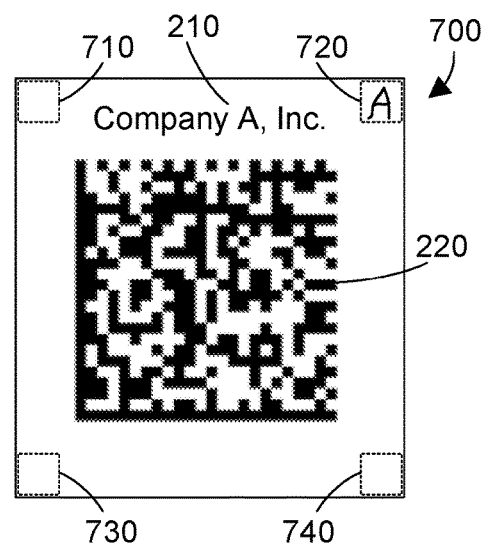
FIG. 9　　　　　　　　FIG. 10

USING LABELS IN A DOCUMENT PROCESSING SYSTEM

BACKGROUND

1. Technical Field

This disclosure generally relates to processing of documents, and more specifically relates to using labels in a document processing system based on hand-written marks on the labels.

2. Background Art

Computer systems have vastly improved the efficiency of many modern workers by providing ways to quickly and efficiently generate and handle electronic documents. Many software tools have been developed that generate and/or process electronic documents in various ways, including word processors, spreadsheets, databases, scanning software, web page development systems, content management systems, hypertext markup language (HTML), extensible markup language (XML), etc. It has long been the goal of many people in the information processing field to realize a "paperless office", which means an office where physical paper documents are completely replaced with electronic documents. However, the dream of achieving a paperless office has not been achieved in most business contexts.

Advances have been made in processing paper using barcode labels that are affixed to documents. When a document that includes a barcode label is scanned, the presence of the label can be detected, and some function can be performed by the system based on the information in the label, such as electronically filing the document in a document management system. An example of a known barcode label is shown in U.S. Pat. No. 6,427,032. Known barcode labels allow system functions to be performed according to information printed on the label. However, the known systems for processing barcode labels do not allow much flexibility in system or user function.

BRIEF SUMMARY

A document processing system uses a label on a document that includes a machine-readable portion that identifies a document, a first defined region corresponding to a system-defined function, and a second defined region corresponding to a user-defined function. When a user hand-writes a mark in the first defined region of the label, when the document is scanned, the mark is detected, and the system-defined function corresponding to the first defined function is performed for the document. When a user hand-writes a mark in the second defined region of the label, when the document is scanned, the mark is detected, and the user-defined function corresponding to the second defined region is performed for the document. The hand-written mark can include a character, with multiple system-defined functions corresponding to different characters in the first defined region, and multiple user-defined functions corresponding to different characters in the second defined region.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 7 is a second specific implementation for the label in FIG. 2;

FIG. 8 shows the label in FIG. 7 after the user has hand-written a check in a checkbox corresponding to a system-defined function;

FIG. 9 shows the label in FIG. 7 after the user has hand-written a check in a checkbox corresponding to a user-defined function;

FIG. 10 shows the label in FIG. 10 after the user has hand-written the character "A" in a checkbox corresponding to a system-defined function;

DETAILED DESCRIPTION

The claims and disclosure herein provide a document processing system that uses a label on a document that includes a machine-readable portion that identifies a document, a first defined region corresponding to a system-defined function, and a second defined region corresponding to a user-defined function. When a user hand-writes a mark in the first defined region of the label, when the document is scanned, the mark is detected, and the system-defined function corresponding to the first defined function is performed for the document. When a user hand-writes a mark in the second defined region of the label, when the document is scanned, the mark is detected, and the user-defined function corresponding to the second defined region is performed for the document. The hand-written mark can include a character, with multiple system-defined functions corresponding to different characters in the first defined region, and multiple user-defined functions corresponding to different characters in the second defined region.

Figure 1:
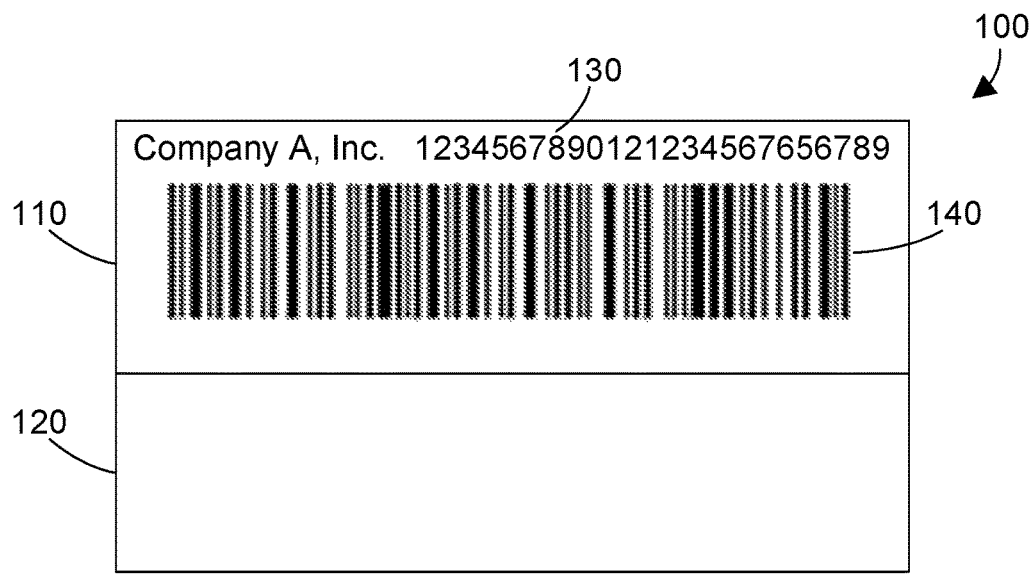
FIG. 1 is a diagram of an example of a known barcode label for use in a document processing system.

FIG. 1 shows one suitable example of a prior art label 100 that could be used in a document processing system. The label 100 is an adhesive label that is applied to a paper document to identify the paper document to the document processing system. When the paper document with the label is scanned, the information on the label is read, and defined processing can be performed on the document. The label 100 includes a first portion 110 and a second portion 120. The first portion 110 includes an eye-legible portion 130 that preferably includes text that can be read by the human eye. In the example shown in FIG. 1, the eye-legible portion contains two different pieces of information. The first is a designation of a company, Company A, Inc. This company designation can be the company that manufactured the label, the company that printed the label, or the company that has the document processing system. When the company designation identifies the company that has the document processing system, this provides an easy way to determine whether the document is managed by the company's document processing system. The eye-legible portion 130 can also include numbers or text that correspond to the numbers or text encoded in the machine-readable portion 140. This allows a human user to read the document identifier in text form above the machine-readable portion 140. The machine-readable portion 140 shown in FIG. 1 is a one-dimensional barcode. The first portion 110 of label 100 is opaque, while the second portion 120 of label 100 is transparent and suitable for writing upon, allowing a person to write hand-written notes on the second portion 120 of label 100. The label 100 is representative of the prior art label shown in FIG. 4b of U.S. Pat. No. 6,427,032.

While the label 100 in FIG. 1 includes a second portion 120 that can include hand-written information that is written by a user, this hand-written information is for the purpose of allowing a user to see the hand-written information. Known document processing systems do not process hand-written information on labels on documents.

Figure 2:
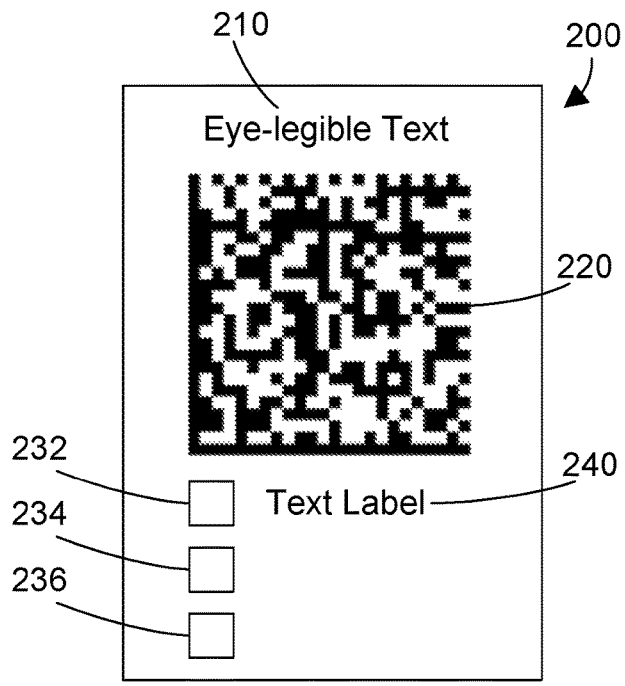
FIG. 2 is a diagram of a barcode label that includes defined regions where a user may hand-write one or more marks to cause the document processing system to perform defined functions.

Referring to FIG. 2, a label 200 in accordance with the disclosure and claims herein includes an eye-legible portion 210 and a machine-readable portion 220. The eye-legible portion 210 can include any suitable eye-legible information, including without limitation the information shown in FIG. 1, namely, company name, document identifier, etc., or any other suitable eye-legible information. The machine-readable portion 220 shown in FIG. 2 is a two-dimensional barcode. Note, however, the machine-readable portion 220 extends to any suitable technology or symbology that can be printed on a label and that can be read by any suitable scanner, whether currently known or developed in the future.

Label 200 in FIG. 2 includes a first defined region 232 that includes a text label 240 adjacent to the first defined region 232. We assume for this example first defined region 232 with its associated text label 240 corresponds to one or more system-defined functions in a document processing system. For the particular example in FIG. 2, the first defined region 232 is defined by a box, as shown. Label 200 includes a second defined region 234 without text adjacent to the second defined region 234. We assume for this example second defined region 234 corresponds to one or more user-defined functions in a document processing system. For the particular example in FIG. 2, the second defined region 234 is defined by a box, as shown. Label 200 includes a third defined region 236 without text adjacent to the third defined region 236. We assume for this example third defined region 236 corresponds to one or more user-defined functions in a document processing system. For the particular example in FIG. 2, the third defined region 236 is defined by a box, as shown.

Because the label 200 includes one or more regions (e.g., 232) that correspond to one or more system-defined functions in a document processing system, and one or more regions (e.g., 234 and 236) that correspond to one or more user-defined functions in a document processing system, the document processing system can process the document that includes the label 200 in different ways depending on whether any of the defined regions have hand-written marks. Some examples are provided below in FIGS. 3-10 to illustrate the function of a document processing system based on hand-written marks in one or more defined regions of the label.

Figure 3:
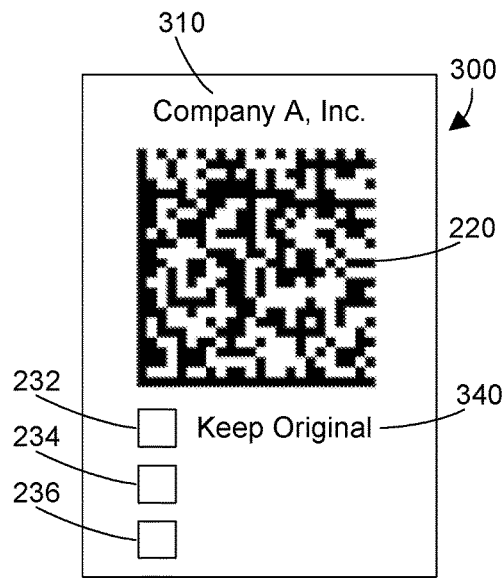
FIG. 3 is a first specific implementation for the label in FIG. 2.

FIG. 3 illustrates one suitable label 300 that is a particular implementation for label 200 shown in FIG. 2. The eye-legible portion 310 in FIG. 3 shows Company A, Inc. The machine-readable portion 220 is shown the same as in FIG. 2, and is assumed to provide machine-readable information that comprises a document identifier that identifies the document the label is on to the document processing system. The first defined region 232 includes a text label 240 "Keep Original" adjacent to the first defined region 232. We assume for this example that "Keep Original" is a system-defined function in the document processing system, so the text "Keep Original" is placed next to the first defined region 232 to visually identify the system-defined function that corresponds to the first defined region 232. The second defined region 234 and third defined region 236 are assumed in this specific example to correspond to one or more user-defined functions in the document processing system. Examples are shown in FIGS. 4-6 to further illustrate.

For the examples herein, we assume label 200 is used by a law firm to manage documents in its document processing system. We assume for a first example that label 200 in FIG. 3 is placed on a document that needs to be retained, such as an original signed contract. The law firm may have a default policy that documents are destroyed after scanning, but original signed contracts need to be kept indefinitely. It is important the law firm have a way to designate such documents be retained, rather than destroyed after scanning. This is easily accomplished using the label 200 in FIG. 3. We assume for this example that label 200 is printed on paper with an adhesive backing covered with a protective film, allowing a user to peel off the protective film to expose the adhesive backing, then press the adhesive backing to the document, such as the front page top right of the document. Once the user affixes the label 300 shown in FIG. 3 to a document, the user can hand-write a mark in the first defined region 232 that corresponds to a system-defined function to keep the original document. The hand-written mark in FIG. 4 is shown as a checkmark in the box that defines the first defined region 232 of label 200. When the document to which the label 200 is affixed is scanned, the hand-written mark in the box at 232 will be detected, and in response, the document processing system will perform a system-defined function corresponding to the first defined region 232. In the example of an original signed contract above, by checking the box 232 that defines the first defined region of label 300, the user informs the document processing system the original of this document should be kept, causing the document processing system to perform one or more system-defined functions as a result. For example, the document processing system could override the default destruction policy for this document and specify to keep the original document, which will prevent the original document from being destroyed after the original document is scanned.

In the specific example of label 300 shown in FIGS. 3-6, we assume the first defined region 232 of the label corresponds to a first system-defined function, while second defined region 234 and third defined region 236 are provided so users can define their own user-defined functions that correspond to these regions. For example, let's assume a user wants special processing for certain documents, such as invoices that exceed $1,000.00. The user could define a user-defined function that corresponds to the second defined region 234. We assume for this example any invoice that exceeds $1,000.00 needs approval from a designated person. The user could thus define a user-defined function that will convert the document to a .pdf file, write the document to the document repository in the document processing system, generate an e-mail to the designated person, attach the .pdf file to the e-mail to the designated person, and send the e-mail with the attached .pdf file to the designated person. We assume for the example in FIG. 5 the user has defined a user-defined function corresponding to the second defined region that causes the document processing system to perform the functions listed above when a hand-written mark is made in the second defined region 234. Thus, for the example in FIG. 5, we assume the user hand-writes a check in the box 234 that defines the second defined region. When the document is scanned by the document processing system, the document processing system will detect the mark in the second defined region 234, and in response, will perform all of the steps in the user-defined function listed above that correspond to the second defined region 234. Because the second defined region 234 and the third defined region 236 are for users to define their own user-defined functions, there is no text label adjacent to these defined regions in the specific example shown in FIGS. 3-6. Note, however, to make user-defined functions more prominent in one of the defined regions on a label, the label could be pre-printed with text such as "User" or "Custom" to provide a visual indication on the label of the user-defined function.

Figure 4:
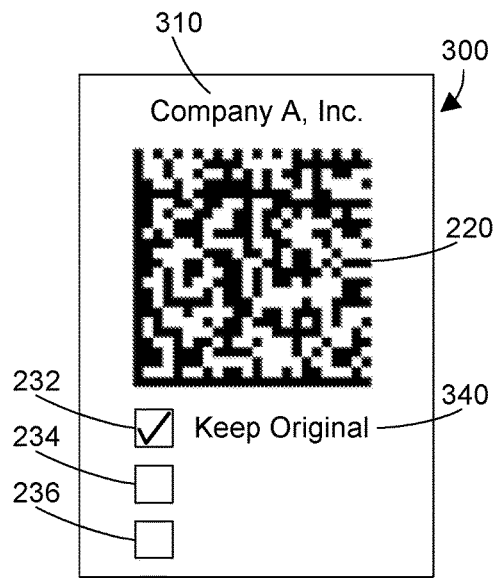
FIG. 4 shows the label in FIG. 3 after a user has hand-written a check in a checkbox corresponding to the Keep Original text.
Figure 5:
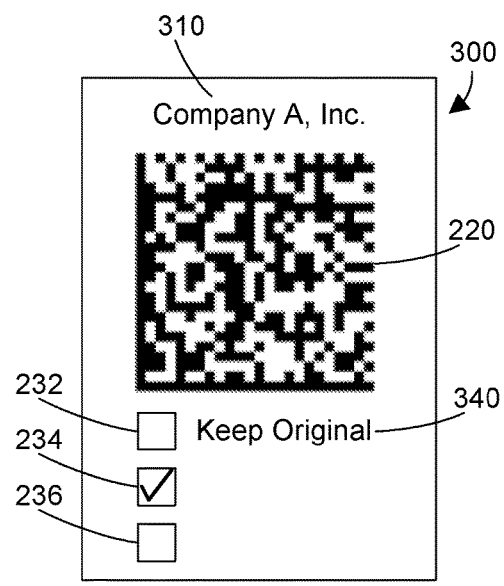
FIG. 5 shows the label in FIG. 3 after the user has hand-written a check in a checkbox corresponding to a user-defined function.
Figure 6:
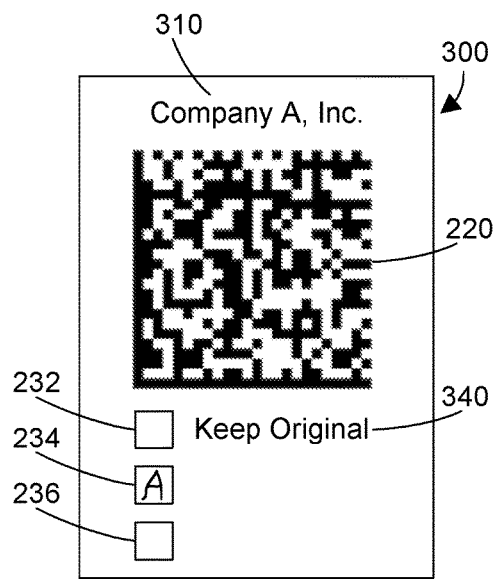
FIG. 6 shows the label in FIG. 3 after the user has hand-written the character "A" in a checkbox corresponding to a user-defined function.

While checks are shown in FIGS. 4 and 5 as suitable examples of hand-written marks, these are shown by way of example. The disclosure and claims extend to making any sort of hand-written mark within any defined region of the label. In an alternative implementation, the user can define multiple different user-defined functions that correspond to different numbers or letters of the alphabet, and the hand-written mark can be a number or letter of the alphabet. Referring to FIG. 6, the second defined region 234 has a hand-written capital letter A. We assume for this example the user has defined three different user-defined functions and assigned the letters A, B and C to the three different user-defined functions, respectively. The document processing system that scans the document that includes the label 300 shown in FIG. 6 can not only detect there is a hand-written mark in the second defined region 234, but can additionally perform character recognition to determine the hand-written mark is a capital letter A. In response to recognizing the capital letter A in second defined region 234 as shown in FIG. 6, the document processing system will perform the first user-defined function for the document, which corresponds to the letter A. If the user hand-writes a letter B in the second defined region 234, the document processing system would recognize the B, and perform the second user-defined function for the document. If the user hand-writes a letter C in the second defined region 234, the document processing system would recognize the C, and perform the third user-defined function for the document.

The example in FIG. 6 shows that instead of merely detecting a mark, the document processing system can detect different characters that correspond to different user-defined actions. In addition, instead of detecting a single character, the document processing system could extend to recognizing any string of multiple characters, with each string corresponding to a different user-defined function. While the specific example above discusses defining multiple user-defined functions that correspond to different characters that could be hand-written in a defined region of the label, it is equally within the scope of the disclosure and claims herein to define multiple system-defined actions that each correspond to a different character or string of characters. In this scenario, multiple system-defined functions could be defined for a single defined region. For example, the label 300 in FIG. 3 could have a single system-defined function that corresponds to the first defined region 232 that performs functions to make sure the original document is kept; could have multiple user-defined functions that correspond to the second defined region 234 by recognizing one or more characters hand-written in the second defined region 234 and performing the corresponding user-defined function; and could have multiple system-defined functions that correspond to the third defined region 236 by recognizing one or more characters hand-written in the third defined region 236 and performing the corresponding system-defined function. These and other variations are within the scope of the disclosure and claims herein.

A label as disclosed herein need not have defined boxes that define regions of the label, as shown by the three boxes 232, 234 and 236 in FIGS. 2-6. Instead, a label could have defined regions that have no boxes or other shapes that define the edges of the defined regions. Such an example is shown in FIGS. 7-10. We assume for this simple example the label 700 includes a first defined region 710, a second defined region 720, a third defined region 730, and a fourth defined region 740. These regions are shown in dotted lines in FIGS. 7-10 to represent these regions are defined, but not printed on the label. For this example, we further assume first and second defined regions 710 and 720 correspond to system-defined functions, and third and fourth defined regions 730 and 740 correspond to user-defined functions. We further assume the first defined region 710 corresponds to a single system-defined function; the second defined region 720 corresponds to multiple system-defined functions that each correspond to a letter of the alphabet; the third defined region 730 corresponds to multiple user-defined functions that each correspond to a letter of the alphabet, and the fourth defined region 740 corresponds to a single user-defined function. With these assumptions, when a user places a hand-written mark in the first defined region 710 as shown in FIG. 8, the document processing system will detect the hand-written mark when the document is scanned, and in response, perform the first user-defined function that corresponds to the first defined region 710 for the document that includes the label. When a user places a hand-written mark in the fourth defined region 740 as shown in FIG. 9, the document processing will detect the hand-written mark when the document is scanned, and in response, perform the single user-defined function that corresponds to the fourth defined region 740 for the document that includes the label. When a user hand-writes the letter A in the second defined region 720 as shown in FIG. 10, the document processing system detects the hand-written mark when the document is scanned, recognizes it as a capital letter A, and performs a system-defined function that corresponds to the letter A for the document that includes the label. As shown by these different examples, the disclosure and claims herein expressly extend to any suitable number of defined regions on a label for any suitable number of system-defined and user-defined functions, and recognizing any suitable mark, including a character or string of characters, determining which system-defined or user-defined function(s) corresponds to the mark, and in response, performing the function(s) for the document that includes the label.

Figure 11:
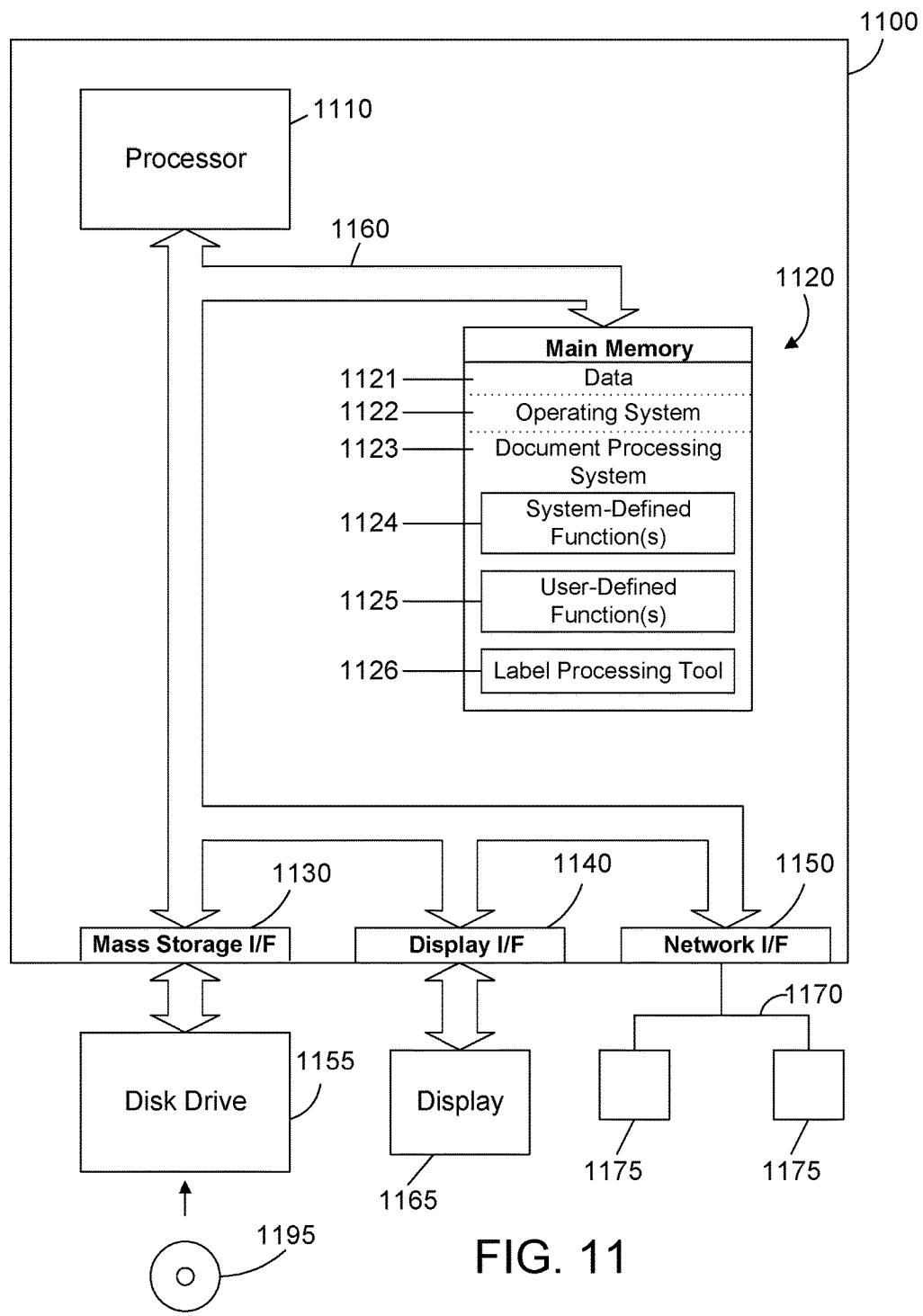
FIG. 11 is a block diagram of a computer system that includes a document processing system that processes the labels in FIGS. 2-10.

Referring to FIG. 11, a computer system 1100 is one suitable implementation of a computer system that could implement the document processing system disclosed and claimed herein. Computer system 1100 could be any suitable computer system, such as a MICROSOFT WINDOWS computer system. WINDOWS is a registered trademark of Microsoft Corporation. Those skilled in the art will appreciate that the disclosure herein applies equally to any computer system, regardless of whether the computer system is a complicated multi-user computing apparatus, a single user workstation, an embedded control system, or a mobile device such as a smart phone, tablet computer, laptop computer, etc. As shown in FIG. 11, computer system 1100 comprises one or more processors 1110, a main memory 1120, a mass storage interface 1130, a display interface 1140, and a network interface 1150. These system components are interconnected through the use of a system bus 1160. Mass storage interface 1130 is used to connect mass storage devices, such as a disk drive 1155, to computer system 1100. One specific type of disk drive 1155 is a readable and writable CD-RW drive, which may store data to and read data from a CD-RW 1195. CD-RW 1195 is one suitable example of non-transitory computer readable media.

Main memory 1120 preferably contains data 1121, an operating system 1122, and a document processing system 1123. The document processing system 1123 includes one or more system-defined functions 1124 and one or more user-defined functions 1125, and further includes a label processing tool 1126 that takes the scanned image of a document and processes the label to determine whether the label has an marks in any of the defined regions, and if so, optionally performing character recognition, and determining which system-defined function(s) or user-defined function(s) corresponds to the mark in a defined region. Additional details of the document processing system are discussed below with reference to FIGS. 12-17. These details are examples of suitable implementations for the document processing system and not limiting of the disclosure or claims herein.

Computer system 1100 can utilize well known virtual addressing mechanisms that allow the programs of computer system 1100 to behave as if they only have access to a large, single storage entity instead of access to multiple, smaller storage entities such as main memory 1120 and disk drive 1155. Therefore, while data 1121, operating system 1122, and document processing system 1123 are shown to reside in main memory 1120, those skilled in the art will recognize that these items are not necessarily all completely contained in main memory 1120 at the same time. It should also be noted that the term "memory" is used herein generically to refer to the entire virtual memory of computer system 1100, and may include the virtual memory of other computer systems coupled to computer system 1100. In addition, computer system 1100 could include one or more virtual machines, with a document processing system 1123 running on one or more virtual machines.

Processor 1110 may be constructed from one or more microprocessors and/or integrated circuits. Processor 1110 executes program instructions stored in main memory 1120. Main memory 1120 stores programs and data that processor 1110 may access. When computer system 1100 starts up, processor 1110 initially executes the program instructions that make up operating system 1122. Processor 1110 also executes the document processing system 1123 under control of the operating system 1122.

Although computer system 1100 is shown to contain only a single processor and a single system bus, those skilled in the art will appreciate that a document processing system as disclosed and claimed herein may be practiced using a computer system that has multiple processors and/or multiple buses. In addition, the interfaces that are used preferably each include separate, fully programmed microprocessors that are used to off-load compute-intensive processing from processor 1110. However, those skilled in the art will appreciate that these functions may be performed using I/O adapters as well.

Display interface 1140 is used to directly connect one or more displays 1165 to computer system 1100. These displays 1165, which may be non-intelligent (i.e., dumb) terminals or fully programmable workstations, are used to provide system administrators and users the ability to communicate with computer system 1100. Note, however, that while display interface 1140 is provided to support communication with one or more displays 1165, computer system 1100 does not necessarily require a display 1165, because all needed interaction with users and other processes may occur via network interface 1150.

Network interface 1150 is used to connect computer system 1100 to other computer systems or workstations 1175 via network 1170. Network interface 1150 broadly represents any suitable way to interconnect electronic devices, regardless of whether the network 1170 comprises present-day analog and/or digital techniques or via some networking mechanism of the future. Network interface 1150 preferably includes a combination of hardware and software that allow communicating on the network 1170. Software in the network interface 1150 preferably includes a communication manager that manages communication with other computer systems or other network devices 1175 via network 1170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within network interface 1150.

While computer system 1100 is shown in FIG. 11 as a stand-alone computer system, one skilled in the art will recognize one or more components in the computer system 1100 could be provided by virtual resources in virtual machines, such as cloud-based virtual machines.

As will be appreciated by one skilled in the art, aspects of the disclosed document processing system may be embodied as a system, method or computer program product. Accordingly, aspects of the document processing system may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the document processing system may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the document processing system may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the document processing system are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 12:
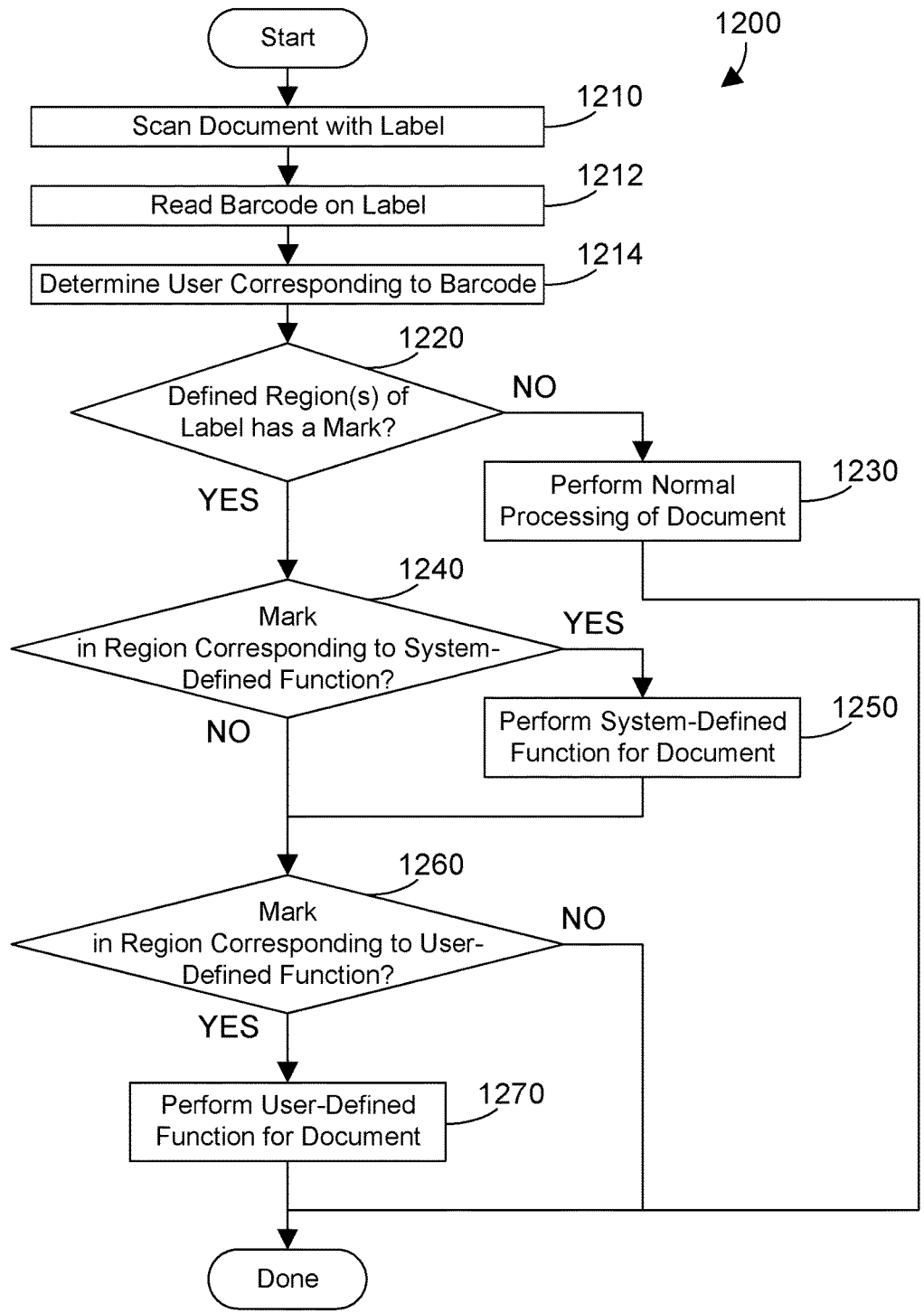
FIG. 12 is a flow diagram of a method for the document processing system in FIG. 11 to perform functions according to hand-written marks in defined regions of a label.

Referring to FIG. 12, a method 1200 is preferably performed by the label processing tool 1126 in the document processing system 1123 shown in FIG. 11. A document with a label is scanned (step 1210). The barcode on the label is read (step 1212). The user corresponding to the barcode is determined (step 1214). The correspondence between user and barcode can be done in any suitable way. For example, the barcode could include a user ID that corresponds to the user, such as an employee number. The barcode could include a unique identifier that has been assigned to a user. For example, if each label includes a unique identifier, when a roll of labels is checked out by a user, all of the unique identifiers for the roll of labels can be assigned to the user so the system knows any of those unique identifiers correspond to the user, whether the unique identifiers are the same unique identifier for all the labels or a range of unique identifiers, one per label. While barcodes are discussed as a specific example in steps 1212 and 1214, these steps apply equally to any suitable machine-readable portion on the label. A check is made to determine whether any defined regions of the label has a hand-written mark (step 1220). If not (step 1220), perform normal processing of the document (step 1230). Note the term "normal processing" can be any suitable processing of a document by the document processing system. An example of normal processing would be to store the document in a document repository managed by the document processing system. The normal processing of the document in step 1230 distinguishes over performing one or more system-defined functions in step 1250 and/or one or more user-defined functions in step 1270. Normal processing of the document means no system-defined function corresponding to a defined region is performed and no user-defined function corresponding to a defined region is performed.

When one or more of the defined regions of the label has a hand-written mark (step 1220=YES), method 1200 determines whether the mark is in a region corresponding to a system-defined function (step 1240). If so (step 1240=YES), one or more system defined functions that correspond to the detected mark are performed for the document (step 1250). When there is no mark in a region corresponding to a system-defined function (step 1240=NO), method 1200 checks to see if there is a detected mark in a region corresponding to a user-defined function (step 1260). Note the user-defined functions will depend on the user that is determined in step 1214. Thus, step 1260 checks the user-defined functions for the user determined in step 1214. If there is no mark in any region corresponding to a user-defined function (step 1260=NO), method 1200 is done. When the mark is in a region corresponding to a user-defined function for the user determined in step 1214 (step 1260=YES), one or more user-defined functions for the user determined in step 1214 that correspond to the region where the mark is detected are performed for the document (step 1270). Method 1200 is then done. Method 1200 illustrates that document processing system 1123 can perform normal processing of a document in step 1230 when no defined region has a hand-written mark, can perform one or more system-defined functions for the document in step 1250 when a mark is detected in a region corresponding to a system-defined function, and can perform one or more user-defined functions for the document in step 1270 when a mark is detected in a region corresponding to a user-defined function for a user corresponding to the barcode.

Figure 13:
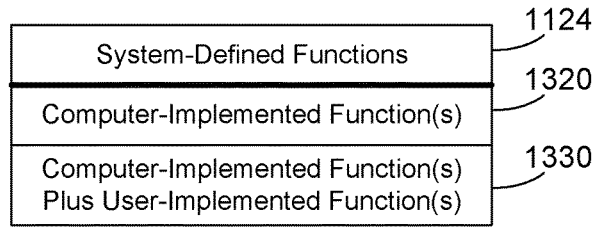
FIG. 13 is a block diagram showing examples of system-defined functions.
Figure 14:
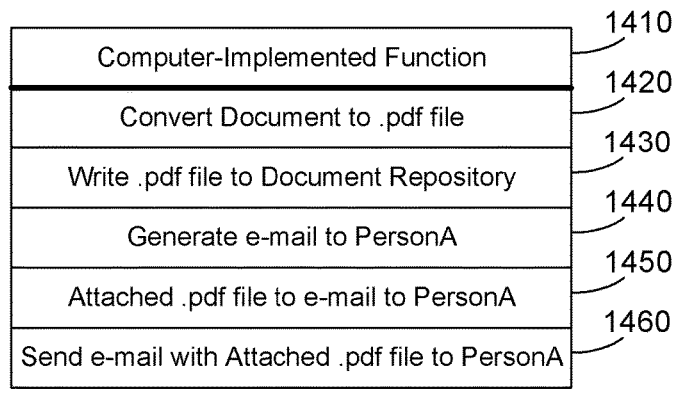
FIG. 14 is a block diagram of a sample computer-implemented function.

A system-defined function can include one or more functions performed by the document processing system itself, and can also include one or more functions performed by a user. FIG. 13 shows that system-defined functions 1124 can include computer-implemented functions 1320 and computer-implemented functions plus user-implemented functions 1330. One example of a computer-implemented function is shown in FIG. 14. We assume a computer-implemented function 1410 is defined that performs the following steps automatically without any required input or action by any user: convert the document to a .pdf file (step 1420); write the .pdf file to the document repository (step 1430); generate an e-mail to PersonA (step 1440); attach the .pdf file to the e-mail to PersonA (step 1450); and send the e-mail with the attached .pdf file to Person A (step 1460). Note that computer-implemented functions are most preferably those functions that can be performed by the document processing system without further interaction with any user. However, it is within the scope of the disclosure and claims herein to define computer-implemented functions that receive input from one or more users.

Figure 15:
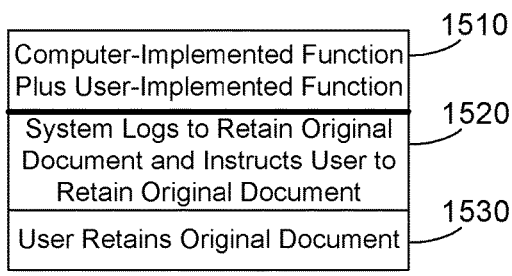
FIG. 15 is a block diagram of a first sample user-implemented function.
Figure 16:
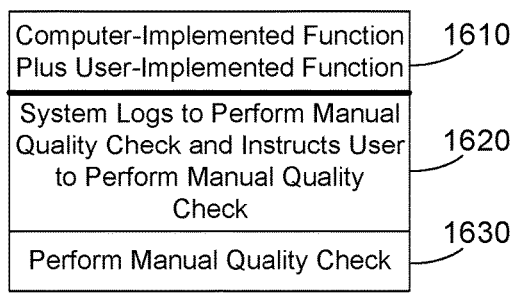
FIG. 16 is a block diagram of a second sample user-implemented function.

Two suitable examples of computer-implemented functions plus user-implemented functions 1330 in FIG. 13 are shown at 1510 in FIGS. 15 and 1610 in FIG. 16. Computer-implemented plus user-implemented function 1510 is to retain the original document. Referring back to FIG. 4, when the defined region 232, which corresponds to the Keep Original text 340 adjacent to the defined region 232, has a mark as shown in FIG. 4, this means a system-defined function is performed to keep the original document. The system-defined function to retain the original document, as shown in FIG. 15, could include a computer-implemented function and a user-implemented function. For the example in FIG. 15, there are two parts to retaining the original document, a computer-implemented function 1520 and a user-implemented function 1530. The computer-implemented function is shown at 1520, which is for the document processing system to log to retain the original document, and to instruct a user to retain the original document. This instruction could specify, for example, a location of where the user should file the original document so the document processing system knows where the original document is filed. In response to the instruction received from the document processing system in 1520, the user takes steps to retain the original document at 1530. For example, the user in user-implemented function 1530 could file the original document in a location designated by the document processing system in the instruction received by the user in step 1520.

Another computer-implemented function plus user-implemented function 1610 in FIG. 16 that could be part or all of a system-defined function is to perform a manual quality check. Performing a manual quality check as shown in FIG. 16 includes a computer-implemented function 1620 and a user-implemented function 1630. The computer-implemented function is shown at 1620, which is for the document processing system to log to perform a manual quality check, and to instruct a user to perform the manual quality check. This instruction could specify, for example, exactly what steps the user should perform for the manual quality check. In response to the instruction received from the document processing system in 1620, the user takes steps to perform the manual quality check at 1530. A manual quality check could include, for example, a check to make sure all the pages are present; a check that all pages are in the same or in a desired orientation; a check to make sure all of each page has been successfully scanned; a check to make sure the scanned soft copy is stored in a document repository managed by the document processing system; etc. System-defined functions 1124 can include any suitable computer implemented functions 1320, and/or any suitable computer-implemented functions plus user-implemented functions 1330. For the computer-implemented functions plus user-implemented functions 1330, there could be an interaction between the documents processing system and the user at different stages. For example, the user could receive at 1620 a message to perform a manual quality check of the paper document, with the message specifying the location of the paper document. The user could retrieve the document, then indicate to the document processing system the user has the document and will perform the manual quality check in due course. The user could interact with the document processing system to verify each of multiple stages of the manual quality check. Once the manual quality check is complete, the user could click on a box to inform the document processing system the manual quality check is complete, which could cause the document processing system to log the manual quality check as complete. While this is an example that is simplified for the sake of illustration, the disclosure and claims herein expressly extend to any suitable interaction between the document processing system and the user for a computer-implemented function plus user-implemented functions 1330.

User-defined functions 1125 in FIG. 11 are most preferably computer-implemented functions. This allows a user to define any set or sequence of computer-implemented functions as a user-defined function, which then allows the document processing system to automatically perform the computer-implemented functions corresponding to the user-defined function without requiring any input from a user. Referring to FIG. 14, the computer-implemented function 1410 could be a system-defined function 1124, or could be a user-defined function 1125. When the computer-implemented function 1410 is a system defined function 1124, the computer-implemented function 1410 is defined by a system administrator of the document processing system and is most preferably made available to all users of the document processing system. When the computer-implemented function 1410 is a user-defined function 1125, a user of the document processing system defines the computer-implemented function 1410, which is then available to that user but is not available to other users of the document processing system. A user can define a user-defined function in any suitable way. For example, a user could define a series of steps to take in sequence, such as steps 1420 through 1460 in FIG. 14. The document processing system could provide a graphical user interface that allows users to define their own user-defined functions in terms of available computer-implemented functions provided by the document processing system. While user-defined functions 1125 are most preferably computer-implemented functions, as shown by the example in FIG. 14, it is also within the scope of the disclosure and claims herein to provide a user-defined function 1125 that requires input from one or more users. For example, the user could define the steps in FIG. 14 as a user-defined function, with steps 1420, 1430, 1440 and 1450 being computer-implemented functions that are done without further input from the user, but with step 1460 being a manual step (user-implemented function) the user must perform. Thus, the system could performs steps 1420, 1430, 1440 and 1450 to prepare the e-mail, then present the e-mail to the user, who could review the e-mail, then click to send the e-mail after the user verifies the e-mail is correct and should be sent. Thus, a user-defined function could be defined that includes steps 1420, 1430, 1440 and 1450 as computer-implemented functions, with step 1460 being a user-implemented function.

Figure 17:
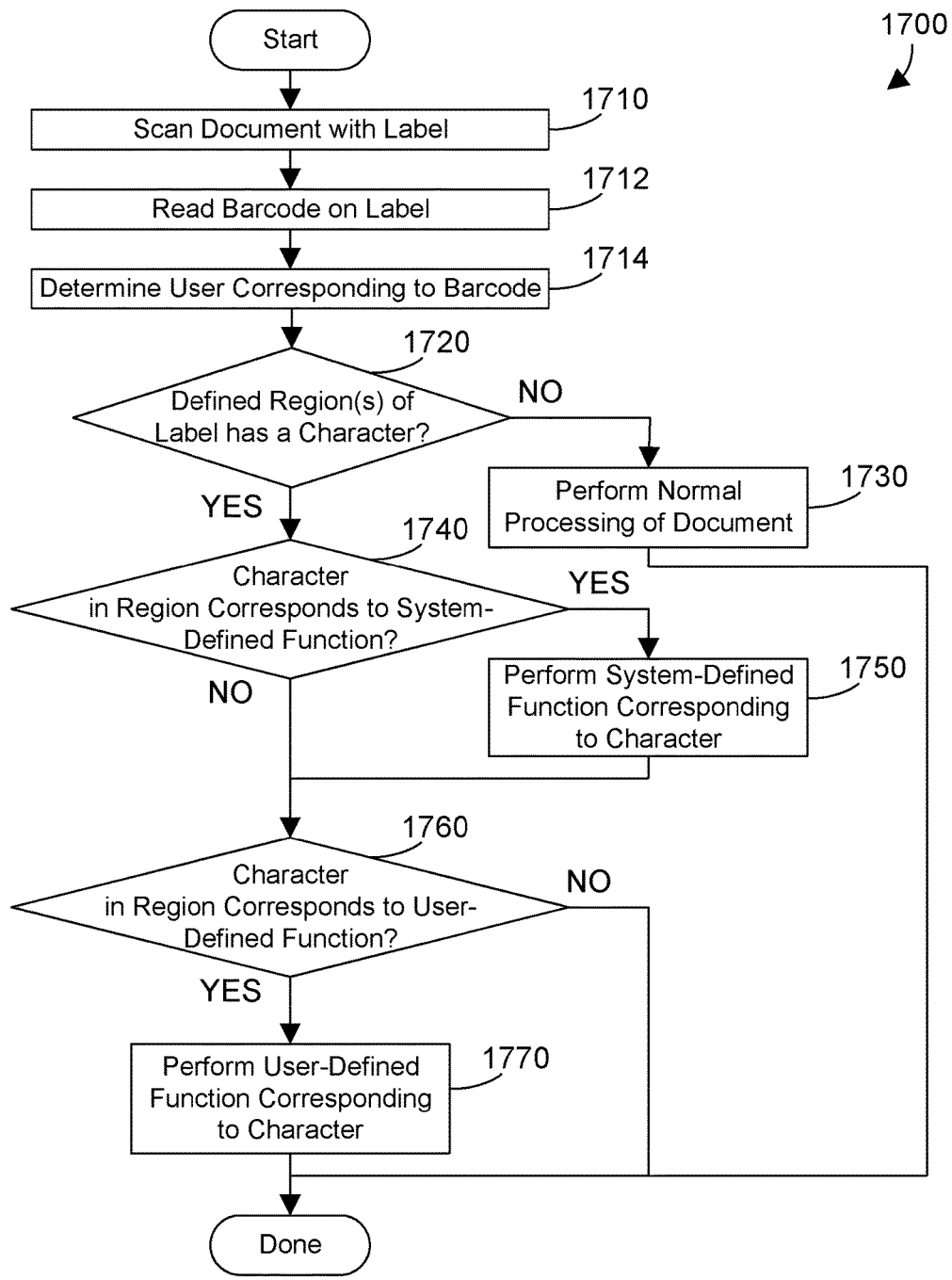
FIG. 17 is a flow diagram of a method that recognizes characters written by a user in one or more defined regions of a label.

Method 1200 in FIG. 12 assumes a defined region has a corresponding system-defined function or user-defined function, and when any mark is in a defined region, the system-defined function or user-defined function that corresponds with the defined region is performed. Method 1200 also extends to defining any suitable mix or combination of system-defined functions and user-defined functions for the same defined region. However, instead of simply looking for any mark in a defined region, the document processing system could also be looking for characters or strings of characters in a defined region. Examples of this are shown in FIGS. 6 and 10, where a user has hand-written a capital letter A in a defined region. In this scenario, it is possible to define more than one function for a defined region, with a selection of which function to perform depending on the character or string hand-written by the user. Referring to FIG. 17, a method 1700 represents steps that may be taken by the label processing tool 1126 in the document processing system 1123 when multiple functions are defined for a defined region, and distinguishing between functions is done by recognizing a character or string of characters. A document with a label is scanned (step 1710). The barcode on the label is read (step 1712). The user corresponding to the barcode is determined (step 1714). When no defined region of the label has any character (step 1720=NO), method 1700 performs normal processing of the document (step 1730). When one or more of the defined regions has a character (step 1720=YES), when the character in the region corresponds to a system-defined function (step 1740=YES), method 1700 performs the system-defined function corresponding to the character (step 1750). When the character in the defined region does not correspond to a system-defined function (step 1740=NO), and when the character in the defined region also does not correspond to a user-defined function (step 1760=NO), this means the character is not defined, so no action is taken in response to detecting the character, and method 1700 is done. When the character in the region corresponds to a user-defined function for the user determined in step 1714 (step 1760=YES), method 1700 performs the user-defined function for the user determined in step 1714 corresponding to the character (step 1770). Method 1700 is then done.

In the most preferred implementation, a label used in the document processing system includes a first defined region that corresponds to a system-defined function and a second defined region that corresponds to a user-defined function. Note, however, a label with a single defined region could be provided that can correspond to either a system-defined function or a user-defined function, depending on a character or string of characters hand-written in the defined region. Thus, region 720 in FIG. 10 could be defined to be a defined region, with a corresponding system-defined function for one character, such as a capital letter A, and with a corresponding user-defined function for a different character, such as a capital letter B. In this specific implementation, the first defined region that corresponds to a system-defined function is the same region as the second defined region that corresponds to a user-defined function, with the difference depending on the character or string recognized in the defined region. These and other variations are within the scope of the disclosure and claims herein.

The document processing system 1123 is most preferably computer software as shown in FIG. 11 residing in main memory 1120 and executed by processor 1110. Note, however, the document processing system 1123 can include any suitable combination of hardware, firmware and software to accomplish the functions described herein. The label processing tool 1126 is preferably a software module within the documents processing system 1123 that performs the functions shown in method 1200 in FIG. 12 and method 1700 in FIG. 17. Note, however, the label processing tool 1126 can also be any suitable combination of hardware, firmware and software to accomplish the functions described herein. The label processing tool 1126 is thus capable of performing all the functions in method 1700 in FIG. 12 and method 1700 in FIG. 17, and in addition, can perform many other functions not explicitly described that are within the scope of the disclosure as described herein.

The combination of the label and document processing system disclosed herein provides a much more powerful and flexible solution that is known in the art. A system administrator can define one or more system-defined functions for one or more defined regions on the label. In addition, individual users can define one or more user-defined functions for one or more defined regions on the label, thereby allowing each user to customize how the document processing system processes a scanned document that includes a label according to hand-written marks, characters, or strings of characters written in one or more of the defined regions.

The labels 200, 300 and 700 shown in FIGS. 2-10 are shown by way of example. The labels could be adhesive-backed labels that are affixed to a paper document, or could be labels that are printed directly on a paper document, such as a first page of the printed document, or on a cover page for the printed document. A document that includes a label or a document with a label can thus be a document with an adhesive label affixed or a document with label directly printed on the document or cover sheet for the document.

The disclosure herein is discussed in terms of marks, characters or a string of characters that are "hand-written" by a user, or that a user "hand-writes" a mark, character or string of character. The term "hand-written", or that a user "hand-writes", are terms that are well-understood to mean a user takes a writing instrument such as a pen, pencil or marker in the user's hand, then uses the writing instrument to write a mark, character or string in the defined region. Note that the term "hand-written" or a user "hand-writes" is not limited to writing with the hands. "Hand-written" and a user "hand-writes" herein includes any method for a user to make a mark using any suitable writing instrument (such as a pen, pencil or marker), regardless of whether the user holds the writing instrument in the user's hand, in the user's mouth, or holds the writing instrument in any other way.

The figures and specification discussed above support a printed label for a paper document comprising: a machine-readable portion that identifies the document to a document processing system that manages the document; a first defined region corresponding to a system-defined function in the document processing system, wherein the document processing system performs the system-defined function when the document that includes the printed label is scanned and the document processing system detects a hand-written mark in the first defined region; and a second defined region corresponding to a user-defined function in the document processing system, wherein the document processing system performs the user-defined function when the document that includes the printed label is scanned and the document processing system detects a hand-written mark in the second defined region.

The figures and specification discussed above also support a computer system comprising: at least one processor; a memory coupled to the at least one processor; a document processing system residing in the memory and executed by the at least one processor, the document processing system comprising: a system-defined function; a user-defined function corresponding to a user; and a label processing tool that receives a scan of a document that includes a label that includes: a machine-readable portion that includes an identifier that identifies the document to the document processing system; a first defined region having corresponding text adjacent the first defined region, wherein the first defined region corresponds to the system-defined function; and a second defined region that does not have corresponding text adjacent the second defined region, wherein the second defined region corresponds to the user-defined function; in response to receiving the scan of the document that includes the label, the document processing system: determines a user corresponding to the label; determines when the first defined region of the label has a hand-written mark, and when the first defined region of the label has the hand-written mark, the document processing system performs the system-defined function corresponding to the first defined region to process the document; and determines when the second defined region of the label has a hand-written mark, and when the second defined region of the label has the hand-written mark, the document processing system performs the user-defined function corresponding to the user that corresponds to the second defined region to process the document.

The figures and specification discussed above further support a computer system comprising: at least one processor; a memory coupled to the at least one processor; a document processing system residing in the memory and executed by the at least one processor, the document processing system comprising: a plurality of system-defined functions; a plurality of user-defined functions that each corresponds to one of a plurality of users of the document processing system; and a label processing tool that receives a scan of a document that includes a label that includes: a machine-readable portion that includes an identifier that identifies the document to the document processing system; a first defined region having corresponding text adjacent the first defined region, wherein the first defined region corresponds to the plurality of system-defined functions; and a second defined region that does not have corresponding text, wherein the second defined region corresponds to at least one of the plurality of user-defined functions; in response to receiving the scan of the document that includes the label, the document processing system performs the following processing: when the first defined region of the label has a hand-written mark, the document processing system performs character recognition to determine whether the mark comprises a character, and when the mark comprises a character that corresponds to one of the plurality of system-defined functions, the document processing system performs the one system-defined function corresponding to the character; and when the second defined region of the label has a hand-written mark, the document processing system performs character recognition to determine whether the mark comprises a character, and when the mark comprises a character that corresponds to one of the plurality of user-defined functions that corresponds to one of the plurality of users, the document processing system performs the one user-defined function corresponding to the character.

The figures and specification discussed above additionally support a system comprising: (A) a label on a document that includes: a machine-readable portion that includes an identifier that identifies the document; a first defined region having corresponding text adjacent the first defined region; and a second defined region that does not have corresponding text adjacent the second defined region; (B) a computer system comprising: at least one processor; a memory coupled to the at least one processor; a document processing system residing in the memory and executed by the at least one processor, the document processing system comprising: a system-defined function that corresponds to the first defined region of the label; a user-defined function that corresponds to the second defined region of the label for one of a plurality of users of the document processing system; a label processing tool that receives a scan of the document that includes the label; in response to receiving the scan of the document that includes the label, the label processing tool: determines the machine-readable portion corresponds to the one of the plurality of users; determines when the first defined region of the label has a hand-written mark, and when the first defined region of the label has the hand-written mark, the document processing system performs the system-defined function corresponding to the first defined region to process the document; and determines when the second defined region of the label has a hand-written mark, and when the second defined region of the label has the hand-written mark, the document processing system performs the user-defined function corresponding to the second defined region to process the document.

The figures and specification discussed above further support a method for processing a document that includes a label, the method comprising: scanning the document that includes the label, the label comprising: a machine-readable portion that includes an identifier that identifies the document; a first defined region; and a second defined region; determining whether the first region of the label has a hand-written mark; determining whether the second region of the label has a hand-written mark; when the first region of the label has a hand-written mark, determining a system-defined function corresponding to the first region, and performing the system-defined function for the document; when the second region of the label has a hand-written mark, determining a user-defined function corresponding to the second region, and performing the user-defined function for the document; and when neither the first region of the label nor the second region of the label has a hand-written mark, not performing the system-defined function corresponding to the first region and not performing the user-defined function corresponding to the second region.

A document processing system uses a label on a document that includes a machine-readable portion that identifies a document, a first defined region corresponding to a system-defined function, and a second defined region corresponding to a user-defined function. When a user hand-writes a mark in the first defined region of the label, when the document is scanned, the mark is detected, and the system-defined function corresponding to the first defined function is performed for the document. When a user hand-writes a mark in the second defined region of the label, when the document is scanned, the mark is detected, and the user-defined function corresponding to the second defined region is performed for the document. The hand-written mark can include a character, with multiple system-defined functions corresponding to different characters in the first defined region, and multiple user-defined functions corresponding to different characters in the second defined region.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer system comprising:
   at least one processor;
   a memory coupled to the at least one processor;
   a document processing system residing in the memory and executed by the at least one processor, the document processing system comprising:
      a system-defined function;
      a user-defined function corresponding to a user; and
      a label processing tool that receives a scan of a document that includes a label that includes:
         a machine-readable portion that includes an identifier that identifies the document to the document processing system;
         a first defined region having corresponding text adjacent the first defined region, wherein the first defined region corresponds to the system-defined function; and
         a second defined region that does not have corresponding text adjacent the second defined region, wherein the second defined region corresponds to the user-defined function;
   in response to receiving the scan of the document that includes the label, the document processing system:
      determines a user corresponding to the label;
      determines when the first defined region of the label has a hand-written mark, and when the first defined region of the label has the hand-written mark, the document processing system performs the system-defined function corresponding to the first defined region to process the document; and
      determines when the second defined region of the label has a hand-written mark, and when the second defined region of the label has the hand-written mark, the document processing system performs the user-defined function corresponding to the user that corresponds to the second defined region to process the document.

2. The computer system of claim 1 wherein the system-defined function comprises a computer-implemented function.

3. The computer system of claim 1 wherein the system-defined function comprises a user-implemented function.

4. The computer system of claim 1 wherein the user-defined function is defined by a user of the document processing system and includes at least one computer-implemented function.

5. The computer system of claim 1 wherein the first defined region corresponds to a plurality of system-defined functions that each correspond to a character, and when the first defined region of the label has a hand-written mark, the document processing system performs character recognition to determine whether the mark comprises a character, and when the mark comprises a character that corresponds to one of the plurality of system-defined functions, the document processing system performs the one system-defined function corresponding to the character.

6. The computer system of claim 1 wherein the second defined region corresponds to a plurality of user-defined functions that each correspond to a character, and when the second defined region of the label has a hand-written mark, the document processing system performs character recognition to determine whether the mark comprises a character, and when the mark comprises a character that corresponds to one of the plurality of user-defined functions, the document processing system performs the one user-defined function corresponding to the character.

7. A computer system comprising:
   at least one processor;
   a memory coupled to the at least one processor;
   a document processing system residing in the memory and executed by the at least one processor, the document processing system comprising:
      a plurality of system-defined functions;
      a plurality of user-defined functions that each corresponds to one of a plurality of users of the document processing system; and
      a label processing tool that receives a scan of a document that includes a label that includes:
         a machine-readable portion that includes an identifier that identifies the document to the document processing system;
         a first defined region having corresponding text adjacent the first defined region, wherein the first defined region corresponds to the plurality of system-defined functions; and
         a second defined region that does not have corresponding text, wherein the second defined region corresponds to at least one of the plurality of user-defined functions;
   in response to receiving the scan of the document that includes the label, the document processing system performs the following processing:
      when the first defined region of the label has a hand-written mark, the document processing system performs character recognition to determine whether the mark comprises a character, and when the mark comprises a character that corresponds to one of the plurality of system-defined functions, the document processing system performs the one system-defined function corresponding to the character; and
      when the second defined region of the label has a hand-written mark, the document processing system performs character recognition to determine whether the mark comprises a character, and when the mark comprises a character that corresponds to one of the plurality of user-defined functions that corresponds to one of the plurality of users, the document processing system performs the one user-defined function corresponding to the character.

8. The computer system of claim 7 wherein the system-defined function comprises a computer-implemented function.

9. The computer system of claim 7 wherein the system-defined function comprises a user-implemented function.

10. The computer system of claim 7 wherein the user-defined function is defined by a user of the document processing system and includes at least one a computer-implemented function.

11. A system comprising:
    (A) a label on a document that includes:
        a machine-readable portion that includes an identifier that identifies the document;
        a first defined region having corresponding text adjacent the first defined region; and a second defined region that does not have corresponding text adjacent the second defined region;

(B) a computer system comprising:
   at least one processor;
   a memory coupled to the at least one processor;
   a document processing system residing in the memory and executed by the at least one processor, the document processing system comprising:
      a system-defined function that corresponds to the first defined region of the label;
      a user-defined function that corresponds to the second defined region of the label for one of a plurality of users of the document processing system;
      a label processing tool that receives a scan of the document that includes the label;
      in response to receiving the scan of the document that includes the label, the label processing tool:
         determines the machine-readable portion corresponds to the one of the plurality of users;
         determines when the first defined region of the label has a hand-written mark, and when the first defined region of the label has the hand-written mark, the document processing system performs the system-defined function corresponding to the first defined region to process the document; and
         determines when the second defined region of the label has a hand-written mark, and when the second defined region of the label has the hand-written mark, the document processing system performs the user-defined function corresponding to the second defined region to process the document.

12. The system of claim 11 wherein the system-defined function comprises a computer-implemented function.

13. The system of claim 11 wherein the system-defined function comprises a user-implemented function.

14. The system of claim 11 wherein the user-defined function comprises a computer-implemented function.

15. A method for processing a document that includes a label, the method comprising:
   scanning the document that includes the label, the label comprising:
      a machine-readable portion that includes an identifier that identifies the document;
      a first defined region; and
      a second defined region;
   determining whether the first region of the label has a hand-written mark;
   determining whether the second region of the label has a hand-written mark;
   when the first region of the label has a hand-written mark, determining a system-defined function corresponding to the first region, and performing the system-defined function for the document;
   when the second region of the label has a hand-written mark, determining a user-defined function corresponding to the second region, and performing the user-defined function for the document; and
   when neither the first region of the label nor the second region of the label has a hand-written mark, not performing the system-defined function corresponding to the first region and not performing the user-defined function corresponding to the second region.

16. The method of claim 15 wherein the system-defined function comprises a computer-implemented function.

17. The method of claim 15 wherein the system-defined function comprises a user-implemented function.

18. The method of claim 15 wherein the user-defined function comprises a computer-implemented function.

* * * * *